May 1, 1934.  J. SNEED  1,956,702
VEHICLE BRAKE MECHANISM
Original Filed March 15, 1928  2 Sheets-Sheet 1
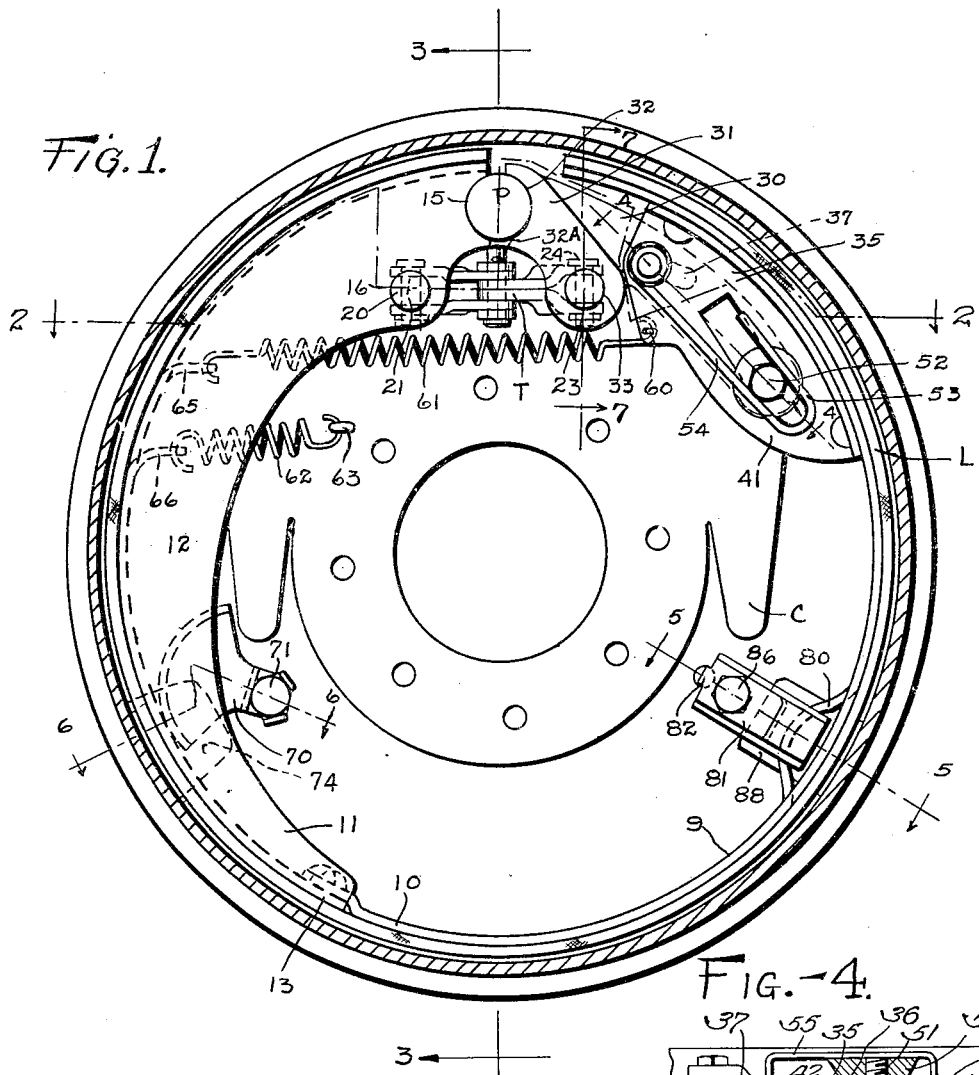
Inventor
John Sneed
By Bates, Macklin, Golrick & Teare
Attorney

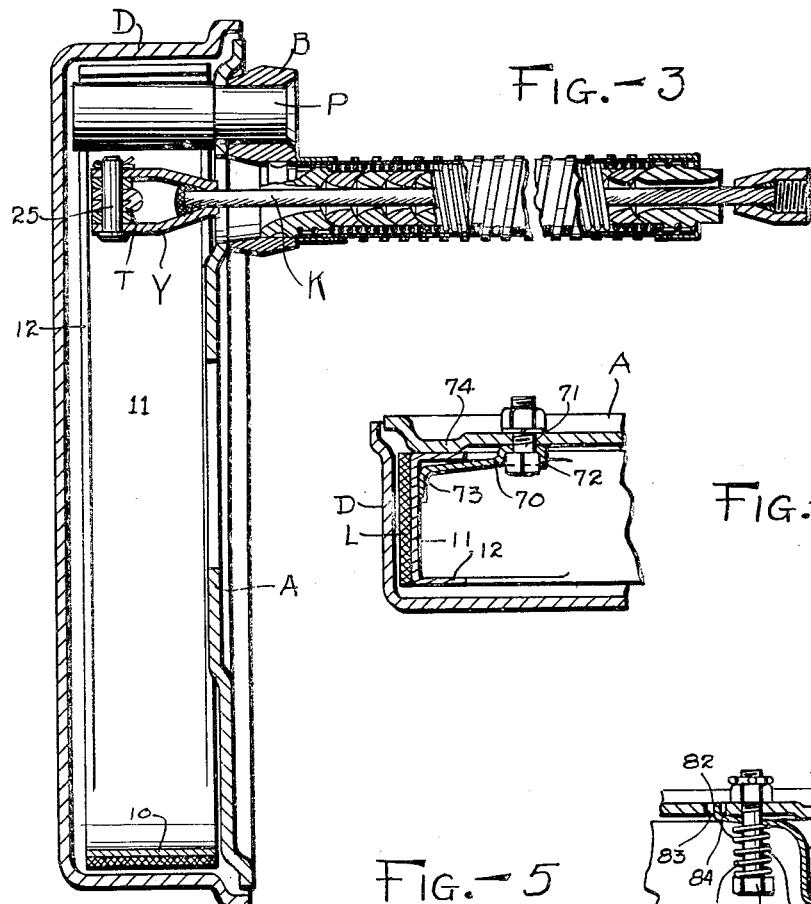
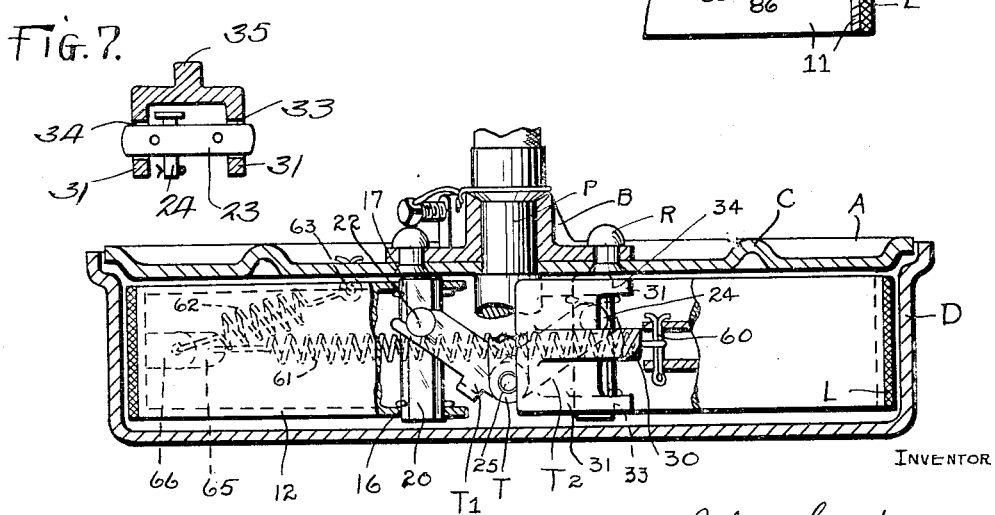

Patented May 1, 1934

1,956,702

UNITED STATES PATENT OFFICE 1,956,702

VEHICLE BRAKE MECHANISM

John Sneed, Detroit, Mich., assignor to The Midland Steel Products Company, Cleveland, Ohio, a corporation of Ohio Application March 15, 1928, Serial No. 261,760. Renewed March 4, 1932. In Great Britain February 6, 1928

30 Claims. (Cl. 188—78)

This invention relates to vehicle brakes and more particularly to the construction and assembly of the brake shoe along with its relation to brake actuating mechanism, adjusting means, retracting means and a device to prevent rattling.

It is among the objects of the invention to provide a brake shoe having substantially 360° of working surface, wherein the wrapping effect is limited by forming a substantial portion of the shoe in a channel section, so that this portion is relatively rigid. The remaining portion of the shoe is formed as a curved band and may preferably comprise somewhat more than half the total length of the shoe. Although the channel portion of the shoe is referred to as being relatively rigid, it has within itself a limited flexibility which varies according to the depth of the channel section. Since the channel section is deepest at one end, it follows that the shoe is characterized as a whole as being of progressively increasing flexibility from substantially one end to the other. An anchor is provided between the ends of the shoe and one of the novel features of this invention is the cooperative relationship between the anchor and the channel shaped portion of the shoe. A shoe spreading device in the form of a toggle is positioned adjacent the anchor and another novel feature of this invention lies in the connection between the toggle and the ends of the shoe. An adjusting member is associated with one end of the shoe and is arranged to cooperate both with the anchor and with the toggle mechanism. The idle position of the shoe is determined by an adjustable stop, which cooperates with the channeled portion of the shoe. Suitable retracting springs are provided to bring the shoe to a desired inoperative position. These springs also tend to maintain the channeled end of the shoe against the anchor in the usual course of brake application. Another novel feature of this invention lies in means for preventing the shoe from rattling. The back plate or apron shown herein is formed to cooperate both with the stop member mentioned above and with the anti-rattling device.

Other objects will appear from the following description of the brake as illustrated in the accompanying drawings. The essential characteristics are summarized in the claims.

In the drawings, Fig. 1 is an elevation including the shoe assembly; Fig. 2 is a partially broken horizontal section of Fig. 1; Fig. 3 is a section taken along the lines 3—3 of Fig. 1; Fig. 4 is a section taken along the lines 4—4 of Fig. 1; Fig. 5 is a section taken along the line 5—5 of Fig. 1; Fig. 6 is a section taken along the broken line 6—6 of Fig. 1; Fig. 7 is a section taken along the line 7—7 of Fig. 1.

Referring particularly to Figs. 1 and 2, a back plate or apron A is carried by a non-rotating part of the vehicle axle and is secured thereto by suitable means, provision being made by a plurality of bolt holes as shown in Fig. 1. The apron may be corrugated as at C to more rigidly support the anchor. The apron carries a bracket B (see also Fig. 3) which in turn carries an anchor pin P. The bracket B may be secured to the apron by such means as rivets R.

The brake illustrated herewith is of the internal expanding type having a drum D rotatable with the wheel. The shoe 10 is of the full floating annular type and comprises a portion 11 which is channeled in section (see also Fig. 6). The channeled portion comprises a lining supporting part and inwardly extending radial side flanges 12. This portion of the shoe as shown constitutes something less than half the length of the shoe. The remainder of the shoe comprises a flat curved portion 9. The relative lengths of the portions 9 and 11 are formed to be preferably as illustrated in Fig. 1. The portions 9 and 11 of the shoe are joined together as at 13 by suitable means such as rivets, as shown, or they may be butt-welded together if desired. Suitable brake lining L is secured to the shoe by any suitable means.

The channel shaped portion of the shoe bears directly against the anchor pin P, the side flanges 12 being cut away to form arc shaped bearing surfaces as at 15 so that when this end of the shoe takes the braking torque the channel shaped portion of the shoe may pivot about the axis of the anchor pin. The side flanges 12 of the channel shaped portion of the shoe are provided with a pair of aligned openings 16 and 17 (see also Fig. 2) in which is carried a pin 20 the axis of which lies parallel to the axis of the anchor pin and to which is connected an arm of a toggle mechanism for spreading the shoe ends. The end of the pin abuts the apron and spaces the shoe therefrom.

It is to be noted that the pin 20 has its upper and lower surfaces flattened as at 21 to provide planular areas engageable by the upper and lower parts of one of the toggle arms. A vertically extending pin 22, see also Fig. 2, extends through the pin 20 and receives the end of one of the toggle arms. Suitable means such as cotter pins retain the pin 20 against endwise movement relative to the side flanges of the channel. Suitable means such as cotter pins retain the pin 22. Adjustably secured to the opposite or flexible end of the shoe is a member 30 which has a pair of inwardly extending radial portions 31, see also Fig. 2, and which are provided with arcuate bearing surfaces 32 engaging the anchor pin;

the lower edges of which are rounded as at 32A. The portions 31 have a pair of aligned openings 33 and 34, in which is carried a pin 23 similar to the pin 20 described above. This pin also abuts the apron to space the shoe therefrom and carries a pin 24 similar to the pin 22, mentioned above, which is engaged by the end of the other toggle arm.

The spreading mechanism comprises a toggle T having arms T1 and T2 engaging respectively the pins 20 and 23. A pin 25, see Fig. 3, engaged by both the toggle arms T1 and T2, is also engaged by a yoke Y, so that when the yoke Y is drawn inwardly or to the right as shown in Fig. 3, the toggle is flattened and the ends of the shoe are moved from each other. A cable K is secured within the yoke Y and may be drawn by suitable connections with brake operating mechanism not shown. The cable is carried in a flexible conduit which may be similar to that illustrated and described in my application Ser. No. 51,094. It will be noted that universal movement is provided between the toggle mechanism and the respective ends of the shoes, and also that the toggle is free to move bodily circumferentially when the brake is applied.

As above mentioned the member 30 is adjustably secured to the end of the flexible portion of the shoe. The member 30 in addition to having parts engageable with the toggle and with the anchor, has a tailpiece 35 (see also Fig. 4) extending circumferentially of the shoe. This tailpiece extends between a pair of angle members 40 and 41 which are secured to the shoe and extend radially inward, as shown in Fig. 1. Referring particularly to Fig. 4, these angle members 40 and 41 have openings 42 punched out, and have edges inturned as at 43. The end of the tailpiece 35 has a beveled edge at its end as at 36. Between the inturned edges 43 and the beveled edge 36 of the tailpiece 35 there is arranged a wedge block 50 which may be drawn inwardly to move the member 30 longitudinally relative to the body of the shoe. The tailpiece 35 has a slotted opening 37, through which a bolt 38 passes. The bolt 38 is carried by the flanges of the members 40 and 41 and maintains the relation between the angles and the member 30 when it is moved. A screw 51 having a head 52 passes through a washer 53, is in threaded engagement with the wedge 50, and serves to draw the wedge inwardly to effect adjustment. A locking spring 54 engages the head of the screw 51 and holds it against rotation. A flat clip member 55 overlies the wedge 50 and extends through an aperture in the angle member 40 at one end, as at 56, and receives the head of the bolt 38 at its other end and serves the dual function of keeping the parts in place during assembly and in preventing rotating of the bolt 38 during adjustment. Extending between the radial flanges of the angle pieces 40 and 41 is a cotter pin 60 (see also Fig. 2), which is engaged by one end of a retractor spring 61. Referring back to the channel shaped portion of the shoe there are punched inwardly from the lining supporting surface a pair of tangs 65 and 66. The tang 65 is engaged by the other end of the spring 61 mentioned above, so that the spring 61 tends to draw both ends of the shoes toward each other and onto the anchor pin. A second spring 62 engages the tang 65 and secured to the back plate or apron as at 63, and tends to draw the channel shaped portion of the shoe inwardly and out of contact with the drum.

The inward movement of the channel shaped portion of the shoe as urged by the spring 62, is limited by an adjustable stop 70 (see also Fig. 6), which stop is secured to the apron by a bolt 71, the head of which is engaged in a depression in the stop member as at 72. The outer surface of the stop comprises an inturned flange portion 73 which lies against the lining supporting portion of the shoe. This inturned edge 73 lies eccentric with relation to the bolt 71 so that the idle position of this portion of the shoe is fixed by the position of the stop member 70. The stop member 70 lies within and proximate to the inner side flange 12 of the shoe. At this point the apron is dented inwardly as at 74 and the shoe is held against this indented portion of the apron by the axial component of the strain on the spring 62 as well as by the friction between the portion 73 of the stop and the inner face of the shoe. It will also be noted that the maximum axial travel of the shoe is strictly limited between the body of the stop member and the indent 74 of the apron.

At a point approximately equidistant from the stop member 70 and from the anchor pin P there is provided an anti-rattling device engaging the flat curved portion 9 of the shoe. This portion of the shoe has a part 80 (see Figs. 1 and 5) sheared and pressed inwardly which is engaged by the member 81. The member 81 has a tip 82 extending through an aperture in the apron as at 83. The member 81 is so formed that it has a point contact with the apron as at 84 and is urged toward the apron by the spring 85 the strain in which is adjusted by a bolt 86. This device serves to force the shoe toward the apron and maintain it in contact therewith as at 87. At this point the apron has an indenture 88 similar to the indenture 74 mentioned above, which engages the edge of the shoe at the point 87. Thus both of the springs 62 and 85 hold the shoe against raised portions of the apron and serve to prevent rattling of the shoe, particularly in its idle position.

In operation, tension on the cable K tends to flatten the toggle and spread the ends of the shoe. The right hand end of the shoe, as viewed in Fig. 1, is first moved away from the anchor because of the tension of the spring 62. The shoe is positioned in the drum so that in normal operation the drum rotation is clockwise, so that the end of the portion 9 of the shoe first engages the drum and causes a wrapping effect within the portion 9 to be conferred upon the channel portion 11 of the shoe. Under this condition of operation the torque is taken through the side portions of the channel and imposed upon the anchor pin P. When the drum is rotating in the opposite direction, the initial movement of the shoe is similar, but rotation of the drum carries the member 30 back upon anchorage to cause the channel portion of the shoe to be moved away from the anchorage to serve the flat curved portion of the shoe. As the lining of the shoe wears, compensation may be had by moving the member 30 relative to the portion 9 of the shoe. The idle position of the shoe is determined by the accurate and arcuate engagement between the ends of the shoe and the anchor pin on one hand and by the position of the stop member 70 on the other.

Various aspects of the inventions or improvements disclosed herein but not claimed are disclosed and claimed in my copending applications Serial No. 30,459, filed May 15, 1925, Serial No. 48,470, filed August 6th, 1925, Serial No. 72,670, filed December 2nd, 1925, Serial No. 234,081 filed November 18th, 1927, Serial No. 197,329 filed June 8th, 1927, Serial No. 269,677 filed April 13th, 1928.

While I have illustrated and described a preferred embodiment of my invention, I do not care to be limited in the scope thereof other than by the claims appended hereto.

I claim:

1. In a brake, the combination of an anchor, a shoe engageable at either end with said anchor, and a member adjustably secured to one end of said shoe and having axially spaced bearing portions for engaging said anchor.

2. In a brake, the combination of an anchor having a cylindrical surface, a shoe engageable at either end with said anchor, and a member adjustably secured to one end of said shoe and having axially spaced arcuate bearing surfaces engageable with said anchor, said bearing surfaces being flared to facilitate engagement between said member and said anchor.

3. In a brake, the combination of an anchor, a brake shoe having one end disposed adjacent said anchor, means for forcing the shoe away from said anchor, a member adjustably secured to said shoe and having axially spaced portions, and a pin carried in said axially spaced portions and engageable with said means.

4. In a brake, the combination of a cylindrical anchor pin, a shoe engageable at either end with said pin, toggle means for spreading the ends of the shoe disposed adjacent said anchor pin, one end of said shoe being channeled in section and having arcuate anchor engaging surfaces cut in the ends of the side flanges of the channel, a pin revolubly mounted in the said flanges and engaging said toggle means, a member adjustably secured to the other end of said shoe and having a pair of axially spaced anchor engaging portions, a second pin carried by said member and also engaged by said toggle spreading means.

5. In a brake, the combination of an anchor pin, friction means having ends engaging opposite sides of said pin, a pair of members having their axes parallel to the anchor pin and pivotally mounted in one of the ends of said friction means, a toggle movable in the plane determined by the axes of said members, and means providing pivotal engagement between the ends of the toggle and said members whereby universal movement is provided between the toggle and both ends of said friction means.

6. In a brake, an apron, an anchor carried thereon, a shoe having its ends engaging opposite sides of the anchor, pins carried by the ends of the shoes and having their ends in contact with the apron, indentures formed on the apron at points substantially equally spaced from the anchor and from each other and engaging edges of the shoe, and resilient means for urging the shoe toward the apron.

7. In a brake, the combination of an apron, an anchor carried thereby, full floating friction means engageable with said anchor, an adjustable stop member for said friction means carried by the apron, and an anti-rattling device for said friction means also carried by the apron, said anchor, stop member and anti-rattling device being substantially equally spaced from each other.

8. In a brake, a shoe formed with a relatively rigid portion including one end and a relatively flexible portion, an anchor positioned between the ends of the shoe, an adjustable retraction stop member engaging the relatively rigid portion of the shoe, and an anti-rattling device engaging the relatively flexible portion of the shoe.

9. In a brake, the combination of an anchor pin, a brake shoe having one end disposed adjacent said anchor, means operable in a plane parallel to the anchor for forcing said shoe end from the anchor, a member adjustably secured to said shoe and engaging said anchor and having axially spaced bearing portions, a pin lying parallel to said anchor and rotatably mounted in said spaced bearing portions and engageable with said means.

10. In a brake, the combination according to claim 9 wherein said spreading means comprises a toggle having a bifurcated end and wherein said last named pin carries a second pin engageable with the said bifurcated end of said toggle.

11. In a brake, the combination according to claim 9 wherein said last named pin has flattened upper and lower surfaces and wherein said spreading means comprises a toggle having parts engaging said flattened surfaces in non-rotatable relation to said pin.

12. In a brake according to claim 6, the combination with means for spreading the shoe ends engaging said pins and being movable toward the apron while spreading the shoe ends, said pins transmitting the lateral component of force from said means to said apron.

13. In a brake according to claim 6, the combination with a toggle having its ends engaging said pins and having its mid portion spaced from the apron and means for drawing the mid portion of the toggle toward the apron to move said pins apart.

14. A brake according to claim 8 wherein the anchor, the stop member and the anti-rattling device are spaced substantially equidistant from each other.

15. In a brake according to claim 7 wherein means are provided for spacing the body of the shoe away from the body of the apron, said means being positioned adjacent the said stop member and anti-rattling device.

16. In a brake, a shoe having spaced ends and spaced side flanges, pins mounted in said side flanges adjacent the ends of the shoe spanning the width of the shoe normal to the vertical axis, said pins being rotatable in their supports, said pins being movable toward and away from each other when said shoe is expanded, and means for expanding said shoe connected to and acting through said pins.

17. In a brake having an apron, the combination of a cylindrical anchor pin, a shoe engageable at either end with said pin, one end of said shoe being reinforced, the reinforcement extending around the circumference of said shoe to a point adjacent the center, the remainder of said shoe between the reinforced portion and the anchor being unreinforced, toggle means for spreading said shoe connected to said reinforced portion and to said unreinforced portion, said unreinforced portion being adapted to serve said reinforced portion when said shoe is expanded, and means for urging said reinforced portion onto said anchor, means spaced from the end of the shoe and engaging said reinforced portion for limiting said movement and means for forcing said unreinforced portion against said apron to prevent rattling.

18. In a brake, the combination of an apron and an anchor attached to said apron, a brake shoe having separable ends abutting against said anchor, said shoe being reinforced at least in part and means for preventing rattling of the shoe against the apron comprising a member engaging the reinforced portion of the shoe, and urging the shoe radially, means urging the unreinforced portion of the shoe against the apron and resilient means drawing the ends of the shoe against the anchor.

19. A brake comprising, in combination, a circular brake shoe having separable ends, a fixed part adjacent said shoe and having an anchor against which said shoe ends abut, said shoe having a reinforced sector and an unreinforced sector, said reinforced sector extending at least one-third the circumference of the brake shoe, the remainder of said shoe being substantially unreinforced, means for limiting the radial and lateral movement of said shoe, said means comprising a stop member engaging the reinforced portion and limiting the radial movement thereof, an anti-rattling device engaging the unreinforced portion of said shoe and resiliently urging said unreinforced portion toward said fixed part, and resilient members at least one of which spans the ends of said shoe for drawing said shoe ends against the anchor.

20. In a brake, the combination of a brake shoe formed as a split ring, a fixed part having an abutment normal to the vertical axis of the shoe against which the shoe ends abut, said shoe having sectors that vary in flexibility and rigidity, means for limiting the movement of said shoe in one direction when the ends of said shoe are separated, said means engaging the rigid sector of said shoe, resilient means resisting the separation of said ends tending to draw said ends against said abutment, said means engaging both the flexible and rigid sectors of said shoe, and an anti-rattling device engaging the flexible section of said shoe for urging the shoe in another direction.

21. A brake comprising a shoe having separable ends, an anchor, said shoe ends abutting against said anchor, a fixed part supporting said anchor, spreading means for separating the ends of said shoe having a universal connection with the ends of said shoe, said shoe having rigid and flexible portions, stop means engaging the rigid portion of said shoe, means for drawing said shoe against the anchor, resilient means between said stop member and said anchor for drawing the rigid portion of the shoe against the stop member, and means engaging the flexible portion of the shoe for limiting the axial travel thereof.

22. In a brake, an apron, a brake shoe comprising at least in part a flat curved lining supporting portion having a strip pressed inwardly from and longitudinally continuous with the lining supporting portion and adapted to be slidably engaged by an anti-rattling device associated with said apron, and a stop member, engaging the lining supporting portion at a point spaced from the anti-rattling device.

23. The combination of an apron, a brake shoe lying adjacent thereto having a flat curved lining supporting part with an inwardly pressed longitudinally extending strip and a member engaging said strip and means resiliently drawing said member toward said apron and holding said shoe in contact therewith.

24. In a brake, the combination of an apron, a brake shoe laterally engageable with said apron, a member engaging the apron at one end and engaging the shoe at the other end, and resilient means urging said member toward said apron and holding the shoe in contact therewith.

25. In a brake, the combination of a brake drum, an apron, a brake shoe made up of U-section stock including a lining supporting surface and a radial flange, said radial flange extending through a portion of said lining supporting surface whereby varying degrees of flexibility and rigidity are imparted to various sectors of said shoe, and a strip extending inwardly from the lining supporting portion in that section of the shoe devoid of a radial rib, an anti-rattling device associated with the apron, said anti-rattling device being adapted to co-operate with said strip to prevent rattling of said shoe.

26. In a brake, the combination of a rotatable drum having an apron and an annular brake shoe formed as a split ring comprising a circumferential lining supporting portion and a reinforcing flange, means for spreading said brake shoe, said reinforcing flange extending through only a portion of said brake shoe to produce shoe sectors that vary in rigidity, said circumferential lining supporting portion having a strip pressed inwardly therefrom in that section of the shoe devoid of a radial rib and means slidably engaging said strip for resiliently urging the unreinforced portion of said shoe toward said apron.

27. In a brake, the combination of a circular brake shoe comprising a relatively flexible portion and a reinforcing portion, said flexible portion being adapted to serve said reinforcing portion, and a strip pressed inwardly in said flexible portion and means associated with the apron and engaging said strip adapted to urge said strip toward said apron to prevent rattling of said shoe.

28. In a brake, the combination of a drum having an apron, a brake shoe comprising a curved lining supporting portion having an integral radial rib extending throughout a portion of the circumference thereof, a strip pressed inwardly from the lining supporting portion, said strip being pressed inwardly in that portion of the shoe opposed to the reinforcing portion, an anti-rattling device associated with said apron, said anti-rattling device slidably engaging said strip and urging the unreinforced portion of the shoe toward said apron.

29. In a brake, the combination of a drum and an apron, an anti-rattling device associated with said apron and having a part adapted to be resiliently urged toward said apron, a brake shoe made up of stock having angularly disposed parts, one of said parts forming a circumferential lining supporting portion, the other of said parts forming a reinforcing rib therefor, said rib extending throughout a part of said lining supporting portion whereby varying degrees of rigidity and flexibility are imparted thereto, and a strip pressed inwardly from the lining supporting portion in that portion of the shoe devoid of a radial rib, said strip being engaged by said part resiliently and urged toward the brake apron to prevent rattling of the flexible portion of said shoe against said apron.

30. In a brake, the combination of a brake drum having a radial face, a brake shoe comprising a relatively flexible portion and a reinforcing portion, means integral with said flexible portion and extending inwardly therefrom, and means associated with the radial face of said brake drum for urging the flexible portion of said shoe toward the apron through slidable engagement with said inwardly extending means on said brake shoe.

JOHN SNEED.